United States Patent
Wang

(10) Patent No.: US 10,099,356 B2
(45) Date of Patent: Oct. 16, 2018

(54) ADJUSTING ASSEMBLY OF BRAKE CYLINDER INSTALLATION DEVICE

(71) Applicant: BO CHEN HUNG CO., LTD., Taichung (TW)

(72) Inventor: Ming-Yu Wang, Taichung (TW)

(73) Assignee: BO CHEN HUNG CO., LTD., Taichung (TW)

( * ) Notice: Subject to any disclaimer, the term of this patent is extended or adjusted under 35 U.S.C. 154(b) by 208 days.

(21) Appl. No.: 15/355,672

(22) Filed: Nov. 18, 2016

(65) Prior Publication Data

US 2017/0282338 A1 Oct. 5, 2017

(30) Foreign Application Priority Data

Mar. 30, 2016 (TW) .............................. 105110042 A

(51) Int. Cl.
| | | |
|---|---|---|
| B25B 27/00 | (2006.01) | |
| B25B 27/02 | (2006.01) | |
| B25B 27/04 | (2006.01) | |
| F16D 65/00 | (2006.01) | |

(52) U.S. Cl.
CPC ........ *B25B 27/0035* (2013.01); *B25B 27/023* (2013.01); *B25B 27/04* (2013.01); *F16D 65/0043* (2013.01)

(58) Field of Classification Search
CPC ... B25B 27/0035; B25B 27/023; B25B 27/04; B25B 13/48; B25B 13/02; B25B 13/485; B25B 13/50; F16D 65/0043; F16B 23/0007
See application file for complete search history.

(56) References Cited

U.S. PATENT DOCUMENTS

| | | | |
|---|---|---|---|
| 2015/0033914 A1* | 2/2015 | Chen ................... | B25B 27/0035 81/52 |
| 2016/0144470 A1* | 5/2016 | Chen ..................... | B25B 13/50 29/240 |

FOREIGN PATENT DOCUMENTS

TW M435344 8/2012

* cited by examiner

*Primary Examiner* — Robert Scruggs
(74) *Attorney, Agent, or Firm* — Muncy, Geissler, Olds & Lowe, P.C.

(57) ABSTRACT

An adjusting assembly of a brake cylinder installation device is provided, including: a fixing member; a guiding member, connected to the fixing member along an axis thereof, the guiding member having a plurality of sliding grooves therethrough and around the axis; a rotatable body, rotatably arranged between the fixing member and the guiding member, the rotatable body having a plurality of guiding grooves which correspond to the sliding grooves; a plurality of positioning pillars, respectively arranged between the sliding grooves and the guiding grooves, when the rotatable body rotates, the positioning pillars move linearly within the sliding grooves; wherein each said positioning pillar further includes a barrel portion and a rod portion which are retractably connected with each other.

14 Claims, 8 Drawing Sheets

ADJUSTING ASSEMBLY OF BRAKE CYLINDER INSTALLATION DEVICE

BACKGROUND OF THE INVENTION

Field of the Invention

The present invention relates to an automotive repair tool, and more particularly to an adjusting assembly of a brake cylinder installation device.

Description of the Prior Art

As disclosed in TWM435344, an adjuster of a brake cylinder mainly has a plurality of wrench plates for cooperating with the brake cylinders in different dimensions and a driving wrench which is connected to the wrench plates. One of two side faces of the wrench plate has a through hole which is polygonal for a positioning rod of the driving wrench to be disposed therethrough, the other of the two side faces of the wrench plate has two positioning pillars opposite to each other, the two positioning pillars are for being engaged with a notch of a valve of the brake cylinder, and the driving wrench is driven via a gripping rod so as to drive the wrench plate to push the valve in an valve opening inward and back to an original position of the valve body.

However, the positioning pillar of the wrench plate is in a fixed dimension, so the positioning pillar can only be adapted to the valve of the brake cylinder of a single automobile; therefore, a user needs to put the wrench plates in different dimensions in a toolbox in accordance with various requirements, and the toolbox is too heavy and too large and is inconvenient to be carried around.

The present invention has arisen to mitigate and/or obviate the afore-described disadvantages.

SUMMARY OF THE INVENTION

The major object of the present invention is to provide an adjusting assembly of a brake cylinder installation device, which uses a rotation of a rotatable body to control a distance between either two of a plurality of positioning pillars neighboring to each other, a positioning pillar is retractable and can be used in installation operations of brake cylinders of different automobile types.

To achieve the above and other objects, an adjusting assembly of a brake cylinder installation device is provided, including: a fixing member; a guiding member, connected to the fixing member along an axis thereof, the guiding member having a plurality of sliding grooves therethrough and around the axis; a rotatable body, rotatably arranged between the fixing member and the guiding member, the rotatable body having a plurality of guiding grooves which correspond to the sliding grooves; a plurality of positioning pillars, respectively arranged between the sliding grooves and the guiding grooves, when the rotatable body rotates, the positioning pillars move linearly within the sliding grooves; wherein each said positioning pillar further includes a barrel portion and a rod portion which are retractably connected with each other.

A number of the sliding grooves is either odd or even.

A number of the sliding grooves is six.

Each of the sliding grooves is angled with neighboring one of the sliding grooves at 60 degrees.

Each said guiding groove is a curved.

The rotatable body has a through hole surrounded by the guiding grooves, and a side of the fixing member neighboring to the rotatable body has a fixing pillar which is inserted into the through hole and fixedly connected to the guiding member.

The guiding member further has a sleeve portion which is engaged with the fixing pillar.

The adjusting assembly of the brake cylinder installation device further includes a bolt which is disposed through the sleeve portion and screwed with the fixing pillar.

A spring is arranged in the barrel portion and urges the rod portion, and the rod portion normally protrudes outside the sliding groove.

One of two ends of the barrel portion has a stopping edge abutable against a side of the guiding groove neighboring to the fixing member.

The other of the two ends of the barrel portion has an anti-off block which restricts the rod portion within the barrel portion.

An outer periphery of the rotatable body has a frictional pattern.

A side of the fixing member opposite to the rotatable body has an engaging portion.

The engaging portion is a polygonal post.

Therefore, a user can rotate the rotatable body to adjust a distance between either two of the positioning pillars neighboring to each other so as to cooperate with the brake cylinder in different dimensions and further to make a toolbox smaller and lighter and easy to be carried around.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
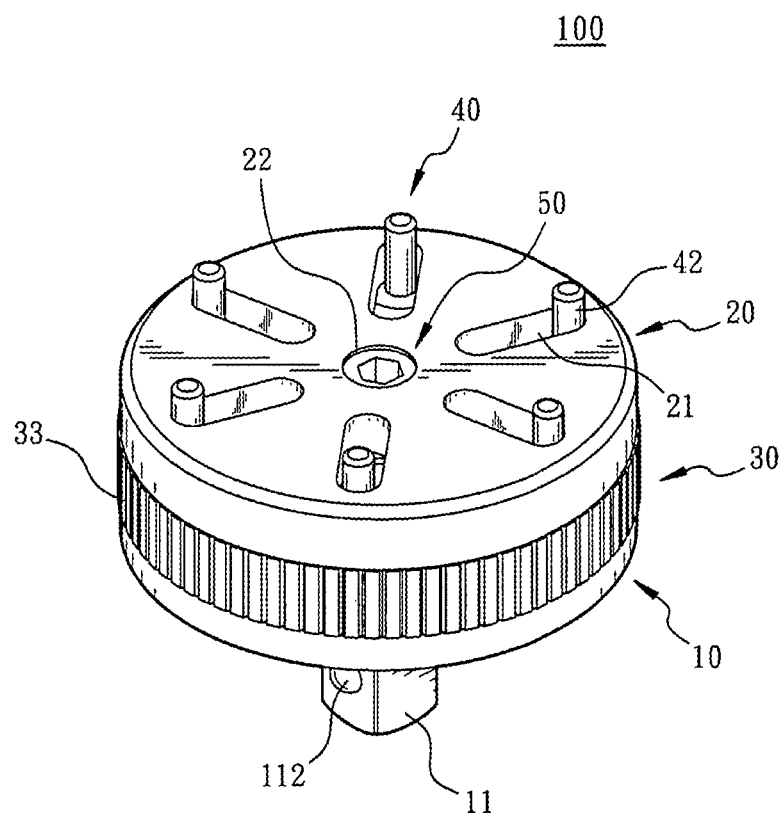
FIG. 1 is a drawing showing the present invention.
Figure 2:
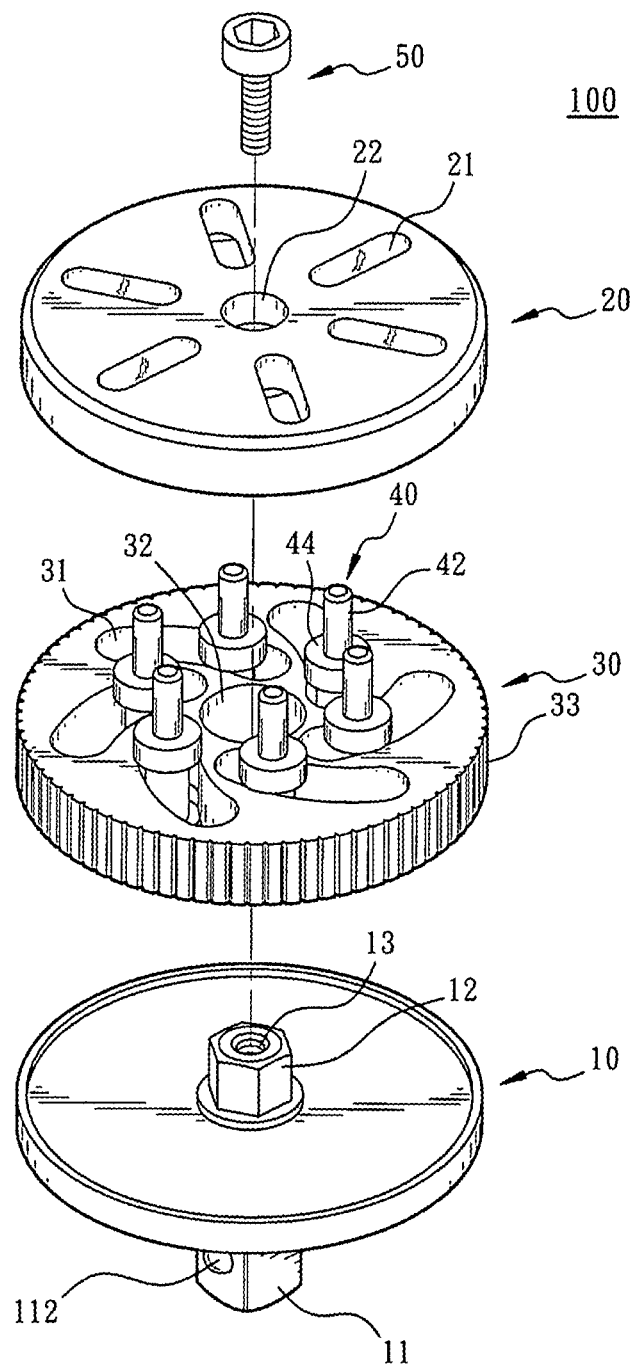
FIG. 2 is a breakdown view of the present invention.
Figure 3:
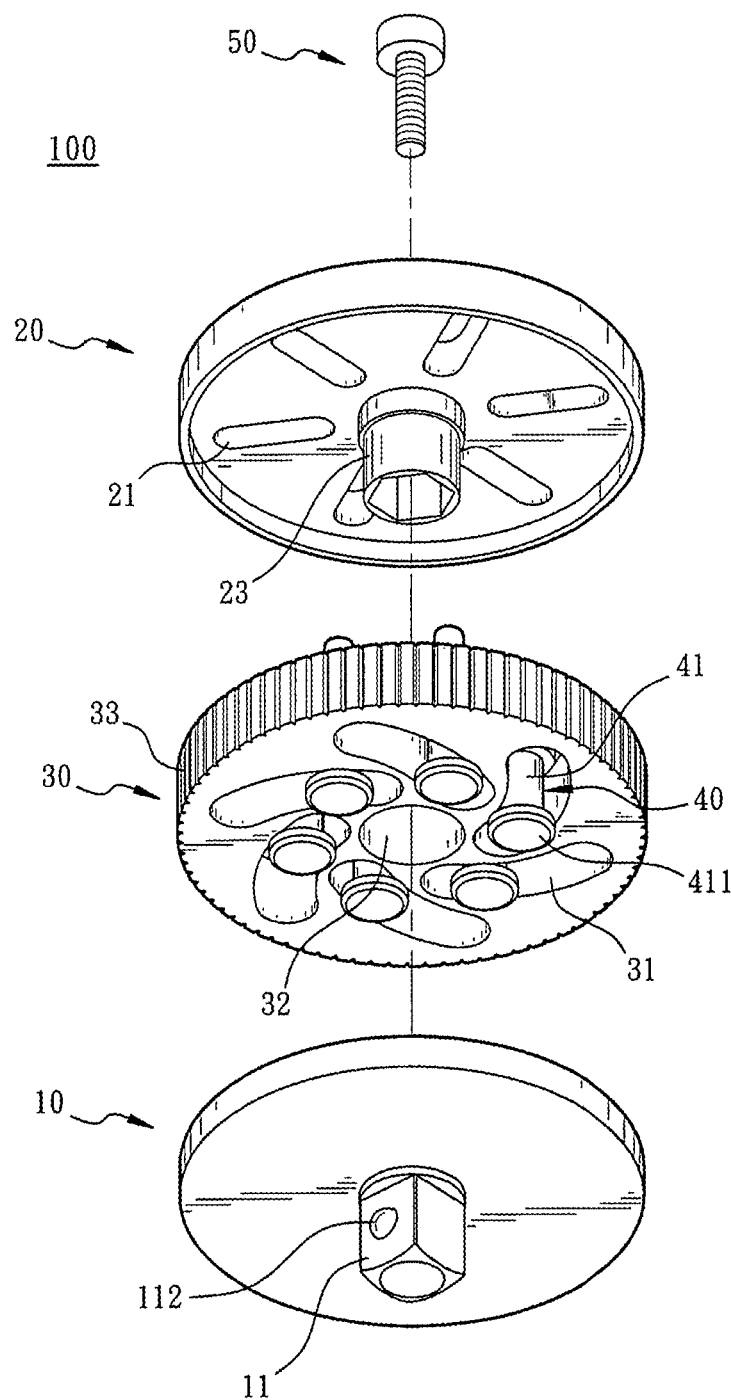
FIG. 3 is a breakdown view of the present invention in another perspective.
Figure 4:
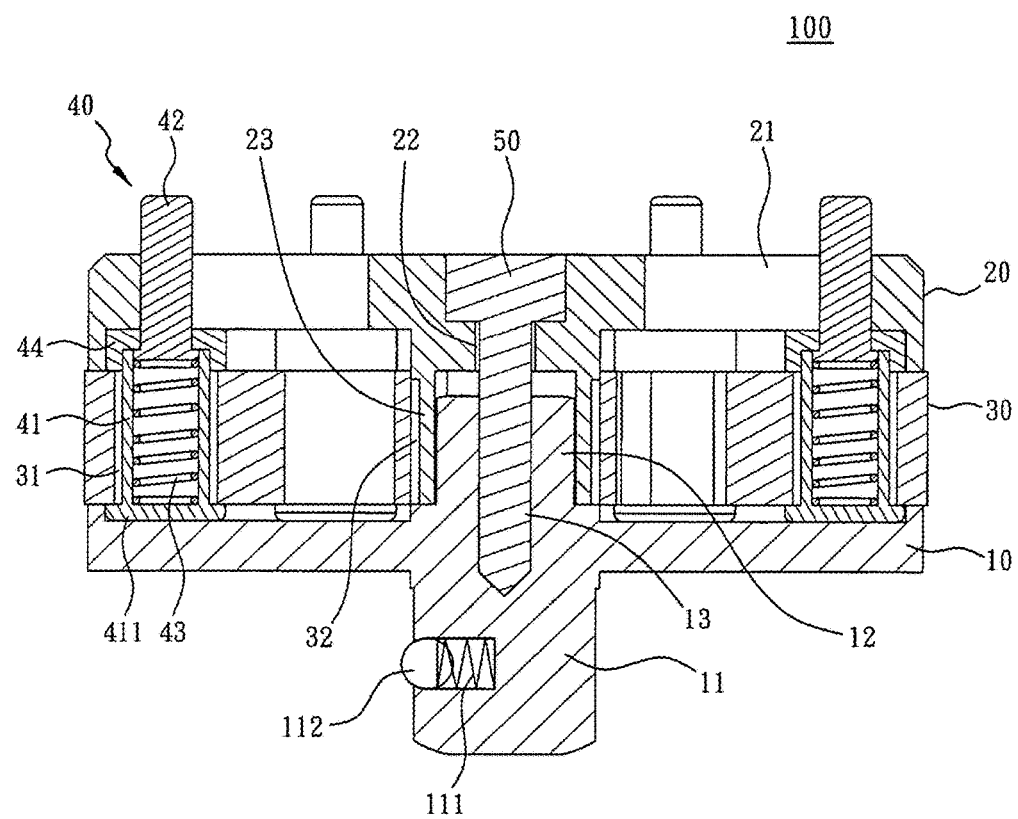
FIG. 4 is a cross-sectional view of an adjusting assembly of the present invention.

The present invention will be clearer from the following description when viewed together with the accompanying drawings, which show, for purpose of illustrations only, the preferred embodiment in accordance with the present invention.

Please refer to FIGS. 1 to 8 for an adjusting assembly 100 of a brake cylinder installation device, including a fixing member 10, a guiding member 20, a rotatable body 30 and a plurality of positioning pillars 40. The rotatable body 30 is rotatably arranged between the fixing member 10 and the guiding member 20 so as to rotate the rotatable body 30 to adjust a distance between either two of the positioning pillars 40 neighboring to each other for being used in installation operations of brake cylinders of different automobile types.

Figure 5:
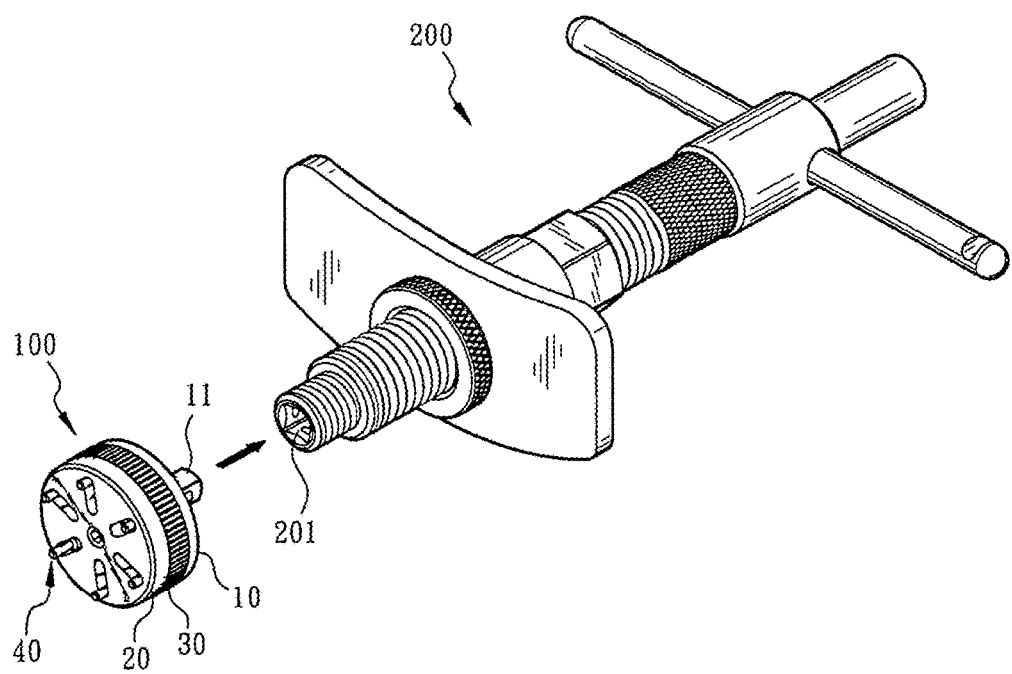
FIG. 5 is a drawing showing the present invention cooperating with a driving wrench.

Specifically, the fixing member 10 is disc-shaped. A side of the fixing member 10 opposite to the rotatable body 30 has an engaging portion 11, the engaging portion 11 is a polygonal post for being engaged with a connecting hole 201 on an end portion of a driving wrench 200 (as shown in FIG. 5). A side of the fixing member 10 neighboring to the rotatable body 30 has a fixing pillar 12, and the fixing pillar 12 has a screwing hole 13. It is to be noted that the engaging portion 11 further has an elastic body 111 and a restricting ball 112, and the restricting ball 112 is abutted by the elastic body 111 to be stably engaged within the connecting hole 201.

The guiding member 20 is connected to the fixing member 10 along an axis thereof, the guiding member 20 has a plurality of sliding grooves 21 therethrough and around the axis, and the sliding grooves 21 form a radial shape. A number of the sliding grooves 21 is either odd or even, a number of the sliding grooves 21 is preferably six, and each of the sliding grooves 21 is angled with neighboring one of the sliding grooves 21 at 60 degrees therebetween. In addition, the guiding member 20 has an assembling hole 22 between two of the sliding grooves 21 neighboring to each other, the assembling hole 22 communicates with a sleeve portion 23 which is hollow, and the sleeve portion 23 protrudes toward the rotatable body 30.

The rotatable body 30 is rotatably arranged between the fixing member 10 and the guiding member 20, and the rotatable body 30 has a plurality of guiding grooves 31 which correspond to the sliding grooves 21. Each said guiding groove 31 is curved, and a number of the guiding grooves 31 is six. The rotatable body 30 further has a through hole 32 surrounded by the guiding grooves 31 for the fixing pillar 12 to be disposed therethrough and engaged with the sleeve portion 23 of the guiding member 20. More specifically, a bolt 50 is further provided to be disposed through the assembling hole 22 and the sleeve portion and screwed with the screwing hole 13 of the fixing pillar 12 so as to make the fixing member 10 and the guiding member 20 connect with each other.

An outer periphery of the rotatable body 30 has a frictional pattern 33 to increase touch between fingers and the rotatable body 30 for the user to drive the rotatable body 30 to rotate.

The plurality of positioning pillars 40 are respectively arranged between the sliding grooves 21 and the guiding grooves 31, when the rotatable body 30 rotates about the bolt 50, and the positioning pillars 40 can move along with the guiding grooves 31 and move linearly within the sliding grooves 21 so that the positioning pillars 40 can be moved toward or away from the bolt 50 within the sliding grooves 21 so as to adjust a distance between each two of the positioning pillars 40 neighboring to each other to cooperate with the brake cylinder of different automobile types.

Specifically, each said positioning pillar 40 further includes a barrel portion 41 and a rod portion 42 which are retractably connected with each other. A spring 43 is arranged in the barrel portion 41 and urges the rod portion 42, and the rod portion 42 normally protrudes outside the sliding groove 21. One of two ends of the barrel portion 41 has a stopping edge 411 abutable against a side of the guiding groove 31 neighboring to the fixing member 10, and the other of the two ends of the barrel portion 41 has an anti-off block 44 which restricts the rod portion 42 within the barrel portion 41.

Please refer to FIG. 5, in actual practice, the engaging portion 11 of the fixing member 10 of the adjusting assembly 100 is sleeved to the connecting hole 201 of the driving wrench 200. At this time, the distance between either two of the positioning pillars 40 neighboring to each other is greatest, and the positioning pillar 40 is located on an end portion of the sliding groove 21 remote from the bolt 50.

Figure 6:
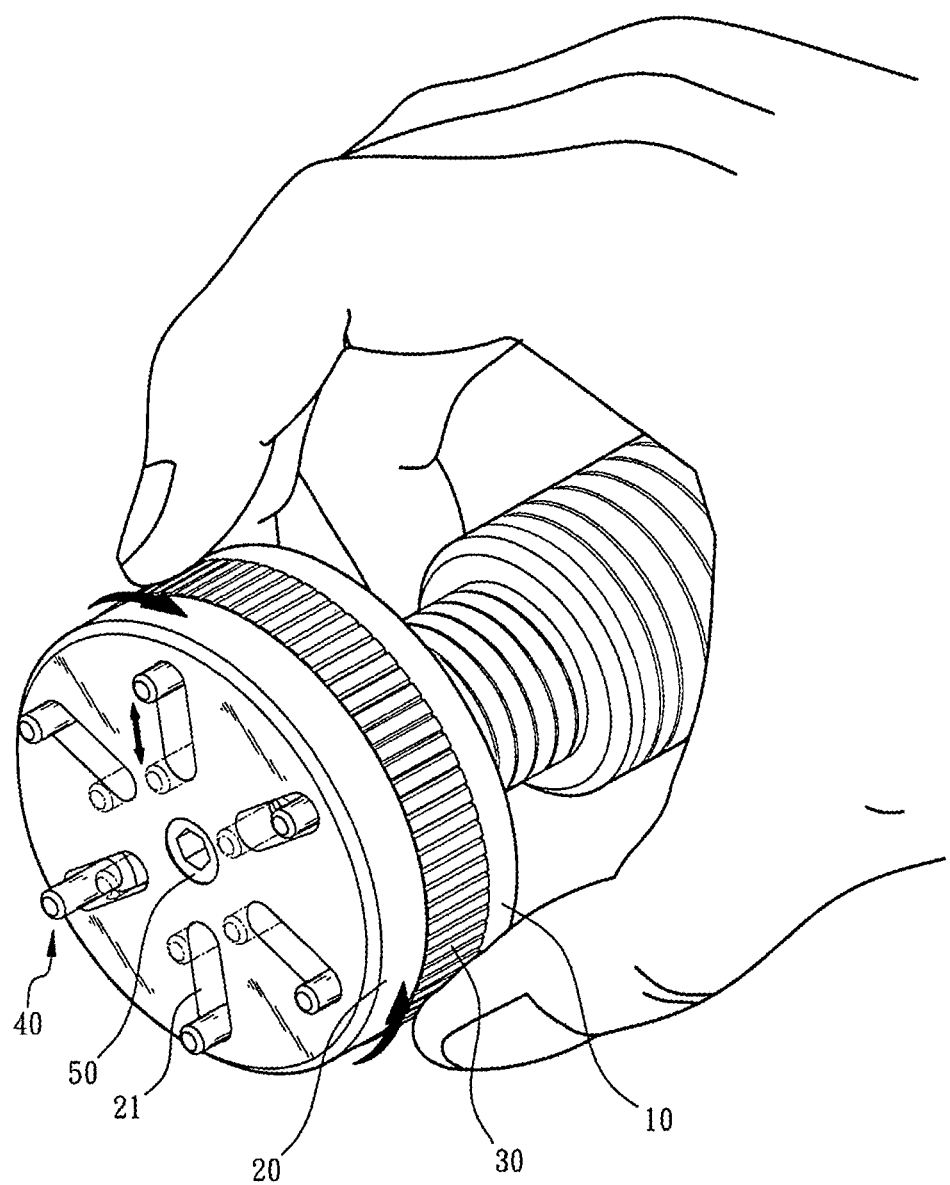
FIG. 6 is a drawing showing an adjusting operation of the present invention.
Figure 7:
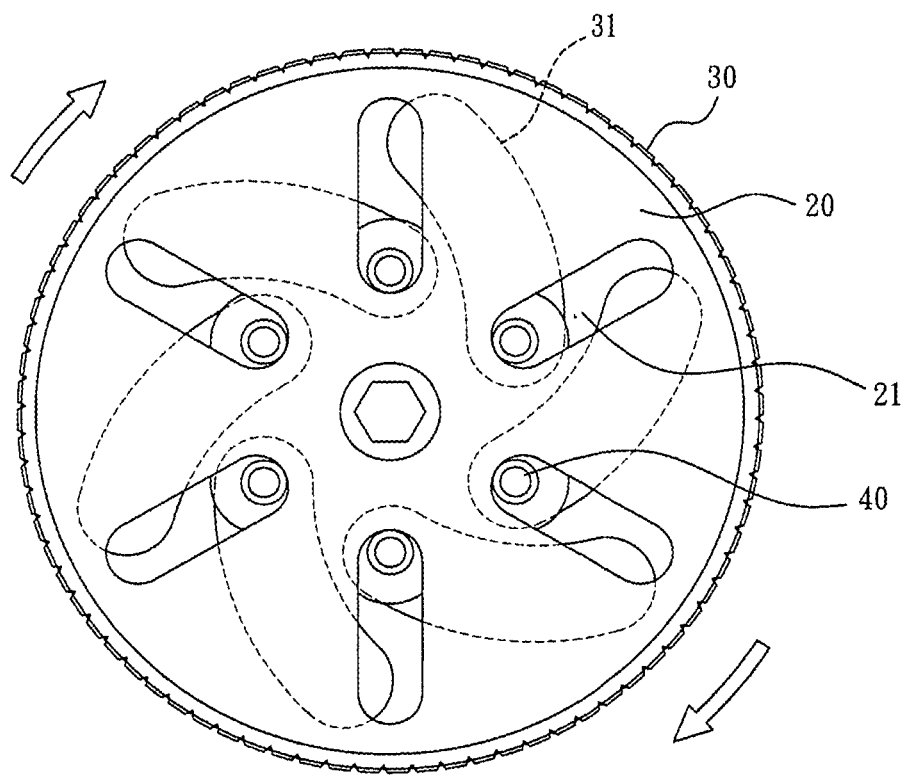
FIG. 7 is a front view of the present invention, showing a gap between either tow positioning pillars neighboring to each other adjusted to a smallest distance.

Please refer to FIGS. 6 and 7, through rotating the rotatable body 30 clockwise, the positioning pillar 40 can move along with the guiding groove 31 and move linearly within the sliding groove 21 so that the distance between either two of the positioning pillars 40 is smallest, and the positioning pillar 40 is adjusted to be located on the end portion of the sliding groove 21 near the bolt 50.

Figure 8:
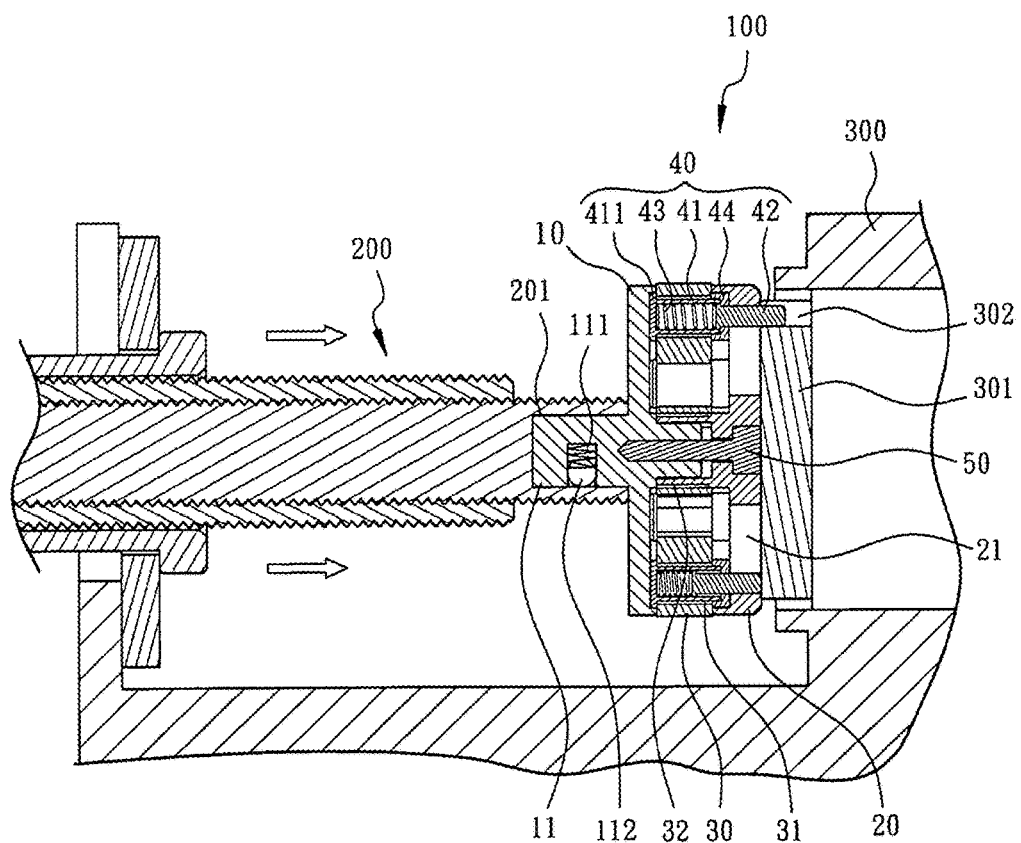
FIG. 8 is a cross-sectional view of a brake cylinder of the present invention.

Please refer to FIG. 8, after being adjusted, the adjusting assembly 100 is connected to a piston 301 of a brake cylinder 300, two said rod portions 42 of the positioning pillar 40 are inserted into a notch 302 of the piston 301 so as to use the driving wrench 200 to drive and conduct an installation operation. Specifically, the positioning pillars 40 of the adjusting assembly 100 which are not cooperate with the notch 302 abut against the piston 301 and therefore are retractable and abut against an outer side face of the piston 301 without influence the installation operation. Therefore, the adjusting assembly can be used on the brake cylinder 300 in different dimensions, and a toolbox can become smaller, lighter and easier to be carried around.

While we have shown and described various embodiments in accordance with the present invention, it should be clear to those skilled in the art that further embodiments may be made without departing from the scope of the present invention.

What is claimed is:

1. An adjusting assembly of a brake cylinder installation device, including:
   a fixing member;
   a guiding member, connected to the fixing member along an axis thereof, the guiding member having a plurality of sliding grooves therethrough and around the axis;
   a rotatable body, rotatably arranged between the fixing member and the guiding member, the rotatable body having a plurality of guiding grooves which correspond to the sliding grooves;
   a plurality of positioning pillars, respectively arranged between the sliding grooves and the guiding grooves, when the rotatable body rotates, the positioning pillars move linearly within the sliding grooves; wherein each said positioning pillar further includes a barrel portion and a rod portion which are retractably connected with each other.

2. The adjusting assembly of the brake cylinder installation device of claim 1, wherein a number of the sliding grooves is either odd or even.

3. The adjusting assembly of the brake cylinder installation device of claim 1, wherein a number of the sliding grooves is six.

4. The adjusting assembly of the brake cylinder installation device of claim 3, wherein each of the sliding grooves is angled with neighboring one of the sliding grooves at 60 degrees.

5. The adjusting assembly of the brake cylinder installation device of claim 1, wherein each said guiding groove is a curved.

6. The adjusting assembly of the brake cylinder installation device of claim 1, wherein the rotatable body has a through hole surrounded by the guiding grooves, and a side of the fixing member neighboring to the rotatable body has a fixing pillar which is inserted into the through hole and fixedly connected to the guiding member.

7. The adjusting assembly of the brake cylinder installation device of claim 6, wherein the guiding member further has a sleeve portion which is engaged with the fixing pillar.

8. The adjusting assembly of the brake cylinder installation device of claim 7, further including a bolt which is disposed through the sleeve portion and screwed with the fixing pillar.

9. The adjusting assembly of the brake cylinder installation device of claim 1, wherein a spring is arranged in the barrel portion and urges the rod portion, and the rod portion normally protrudes outside the sliding groove.

10. The adjusting assembly of the brake cylinder installation device of claim 9, wherein one of two ends of the barrel portion has a stopping edge abutable against a side of the guiding groove neighboring to the fixing member.

11. The adjusting assembly of the brake cylinder installation device of claim 10, wherein the other of the two ends of the barrel portion has an anti-off block which restricts the rod portion within the barrel portion.

12. The adjusting assembly of the brake cylinder installation device of claim 1, wherein an outer periphery of the rotatable body has a frictional pattern.

13. The adjusting assembly of the brake cylinder installation device of claim 1, wherein a side of the fixing member opposite to the rotatable body has an engaging portion.

14. The adjusting assembly of the brake cylinder installation device of claim 13, wherein the engaging portion is a polygonal post.

* * * * *